M. F. McKASTY.
VINE PROTECTOR FOR SPRAYING MACHINES.
APPLICATION FILED MAR. 2, 1921.

1,408,815. Patented Mar. 7, 1922.

Inventor
MARTIN F. McKASTY

By *[signature]*
Attorney

UNITED STATES PATENT OFFICE.

MARTIN F. McKASTY, OF NEW HYDE PARK, NEW YORK.

VINE PROTECTOR FOR SPRAYING MACHINES.

1,408,815.  Specification of Letters Patent.  Patented Mar. 7, 1922.

Application filed March 2, 1921. Serial No. 449,031.

*To all whom it may concern:*

Be it known that I, MARTIN F. MCKASTY, citizen of the United States, and resident of New Hyde Park, in the county of Nassau and State of New York, have invented certain new and useful Improvements in Vine Protectors for Spraying Machines, of which the following is a specification.

This invention relates to spraying machines such as are used in agricultural work for spraying vegetables, or plants generally, to kill insects thereon, or for other purposes, the invention being intended more particularly for application to traction sprayers.

Heretofore, in the use of sprayers of this kind, the plants have been liable to damage from the wheels of the sprayer by reason of the inter-spreading of the rows of plants, and the encroaching of the latter on the space between rows in which the tractor wheels run.

The present invention has for a general object to prevent this damage to the plants from the wheels of the sprayer, and more specifically to equip the sprayer wheels with guards which will push the plants to the side of the wheel path.

For further comprehension of the invention, and of the objects and advantages thereof, reference will be had to the following description and accompanying drawings, and to the appended claims in which the various novel features of the invention are more particularly set forth.

Fig. 1 of the drawings is a side view of a traction sprayer having the invention applied thereto.

Figure 1:
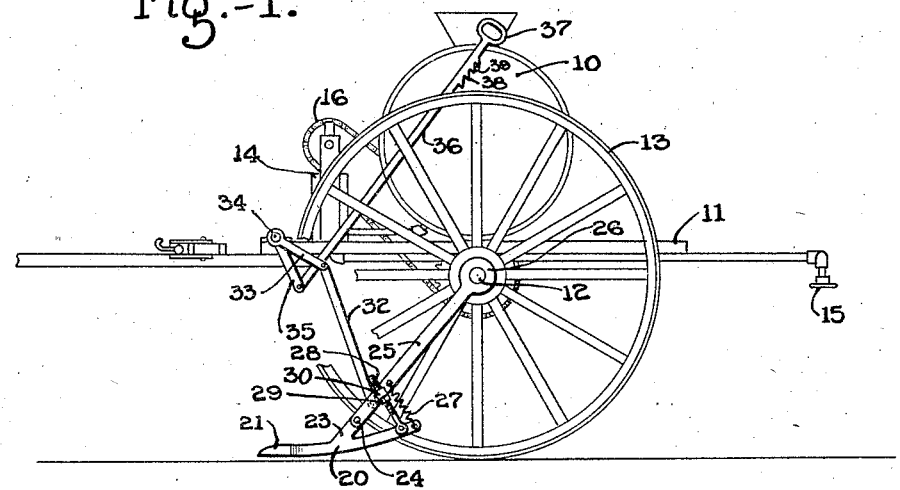
Figure 2:
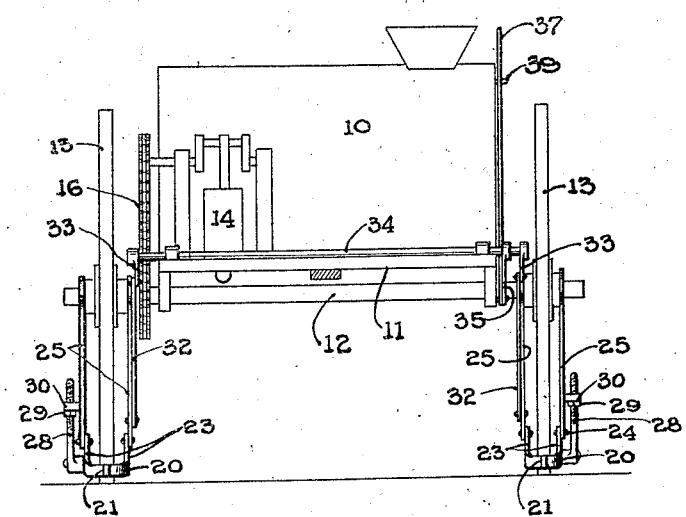
Fig. 2 is a front view thereof.
Figure 3:
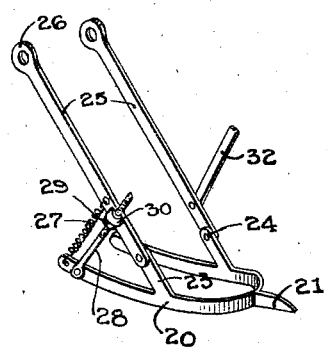
Fig. 3 is a detail perspective view of the novel wheel guard.

The invention may be applied to a sprayer of ordinary type, such as is illustrated in the drawings and which comprises a tank 10 supported on a frame 11 carried by an axle 12 mounted on wheels 13, upon which is also mounted a pump 14 by which the necessary pressure for forcing the solution in the form of a spray from the discharge element 15 is obtained, the pump being operated by a chain drive 16 from the wheels.

In carrying out my invention I provide a guard 20 for each wheel, these guards comprising bars bent to U-form and arranged in a generally horizontal position in front of the wheels 13 with their legs projecting rearwardly on opposite sides of the latter. Projecting forwardly from each guard centrally thereof, is a rigid finger 21 which is beveled on its upper side to a wedge shape.

These bars 20 are adapted to be supported in close proximity to the ground and are here shown as formed, approximately midway of their length, with the short upwardly and rearwardly extending rigid straps 23 whereby the bars are suspended. These straps connect at their upper ends as at 24 to the lower ends of the pairs of arms 25 which are pivotally connected in turn to the axle 12 of the tractor, the arms 25 having eyes 26 formed on their upper end which take freely over the axle.

The bars 20 have their forward ends, on which the fingers 21 are fixed, resiliently held in proper position by means of tension springs such as 27 which are connected at one end to the rear of the bars and at their opposite ends to the arms 25. The angular position of the bars 20, and in consequence the spacing of the fingers 21 above the ground, may be adjusted by means of struts such as 28 hinged at one end to the bars and on each of which is screwed a nut 29 which is pressed by spring 27 against a guide eye 30 on the adjacent arm 25, through which eye the free end of the strut projects loosely.

I also provide for adjusting the entire guards upwardly or downwardly around the axle 12, this being accomplished by links 32 connected at their lower ends to the arms 25 and at their upper ends to arms 33 fixed on a rock shaft 34 on which is also fixed another arm 35 connected to an adjustment rod 36 of the thrust type having a handle 37 on its upper end, this rod having a series of hooked projections 38 spaced along one side thereof and which may be individually engaged over a pin 39 projecting from the end of the tank 10.

As will be apparent the guard members 20 act to thrust aside the outgrowing portions of vines or plants and prevent the same from being crushed by the wheels 13 of the sprayer, while an accurate adjustment of the guards may be had by the members 28 and 36.

Having thus described my invention what I claim as new and desire to protect by Letters Patent of the United States is as follows:

1. In a traction sprayer, a pair of U-shaped guard bars having their legs extending backwardly on opposite sides of the respective wheels of the sprayer, means hinging said guard bars between their front and rear ends, springs acting to swing the front ends of said guard bars downwardly, and means for adjustably limiting the movement of said bars under the action of said spring.

2. In a traction sprayer, a pair of U-shaped guard bars having their legs extending backwardly on opposite sides of the respective wheels of the sprayer, means hinging said guard bars between their front and rear ends, springs acting to swing the front ends of said guard bars downwardly, and means for adjustably limiting the movement of said bars under the action of said spring, said means comprising threaded struts hinged to said bars, guide devices for the free ends of said struts, and nuts threaded on said struts and bearing on said guide devices.

3. In a traction sprayer, a pair of U-shaped guard bars having their legs extending backwardly on opposite sides of the respective wheels of the sprayer, means hinging said guard bars between their front and rear ends, springs acting to swing the front ends of said guard bars downwardly, and means for adjustably limiting the movement of said bars under the action of said spring, said guard bars having projecting fingers on their forward ends.

4. In a traction sprayer, a pair of U-shaped guard bars having their legs extending backwardly on opposite sides of the respective wheels of the sprayer, means hinging said guard bars between their front and rear ends, springs acting to swing the front ends of said guard bars downwardly, and means for adjustably limiting the movement of said bars under the action of said spring, and means for adjusting said guard bars vertically.

5. In a traction sprayer, a pair of U-shaped guard bars having their legs extending backwardly on opposite sides of the respective wheels of the sprayer, means hinging said guard bars between their front and rear ends, springs acting to swing the front ends of said guard bars downwardly, and means for adjustably limiting the movement of said bars under the action of said spring, and means for adjusting said guard bars vertically, said last means comprising arms hinged to the axle of the tractor, links connected to said arms at one end, a rock shaft to which the opposite ends of the links are connected, a thrust rod also connected to said rock shaft, a series of hooked projections on said thrust rod, and a fixed member adapted to be engaged by either of said hooked projections.

Signed at New York city in the county of New York and State of New York this 28th day of February, A. D. 1921.

MARTIN F. McKASTY.